United States Patent [19]
Holly et al.

[11] 4,153,974
[45] May 15, 1979

[54] MOLDING DEVICE

[75] Inventors: James A. Holly, Richton Park; Richard C. Wagner, Frankfort, both of Ill.; Riccardo Fanconi, Brunnen, Switzerland; Edmund Schneider, Richton Park, Ill.

[73] Assignee: Hollymatic Corporation, Park Forest, Ill.

[21] Appl. No.: 833,899

[22] Filed: Sep. 16, 1977

[51] Int. Cl.² .............................................. A22C 7/00
[52] U.S. Cl. ...................................... 17/32; 366/306; 425/205
[58] Field of Search ............... 425/205, 557, 207, 208; 366/302, 306, 307, 182; 17/32

[56] References Cited

U.S. PATENT DOCUMENTS

| | | | |
|---|---|---|---|
| 2,894,733 | 7/1959 | Wosmek | 366/306 X |
| 3,137,029 | 6/1964 | DeZolt | 17/32 |
| 3,285,415 | 11/1966 | Walker | 366/302 X |
| 3,415,206 | 10/1968 | Reisman | 17/32 |
| 3,555,592 | 1/1971 | Anhanger | 17/32 |
| 3,654,665 | 4/1972 | Holly | 17/32 |
| 3,876,741 | 4/1975 | Klein | 425/205 X |
| 3,887,964 | 6/1975 | Richards | 17/32 |
| 3,946,995 | 3/1976 | Anderson | 425/205 X |

FOREIGN PATENT DOCUMENTS

| | | | |
|---|---|---|---|
| 89898 | 3/1896 | Fed. Rep. of Germany | 366/182 |
| 431739 | 3/1948 | Italy | 425/205 |
| 467922 | 6/1937 | United Kingdom | 17/32 |
| 143320 | 6/1961 | U.S.S.R. | 17/32 |

*Primary Examiner*—William R. Briggs
*Attorney, Agent, or Firm*—Wegner, Stellman, McCord, Wiles & Wood

[57] ABSTRACT

A molding device for molding articles of plastic material such as ground raw meat to make hamburger patties and the like while at the same time limiting the maximum total pressure applied to the material. The device comprises a hopper for the material, a mold with a mold opening adapted to communicate with a pressure chamber for receiving pressurized material from this chamber and transfer means in the hopper for moving the material toward an exit portion of the hopper leading to this pressure chamber. In order to direct the material from the transfer means into the pressure chamber there is provided a pressure confining baffle in the hopper with sufficient clearance between the baffle and the transfer means to permit escape of material around the baffle back into the hopper.

11 Claims, 12 Drawing Figures

MOLDING DEVICE

BACKGROUND OF THE INVENTION

This invention relates to a device for molding articles of plastic material of the nature of raw hamburger patties with the device including transfer means in a hopper for feeding the material smoothly and without excessive working into a pressure chamber for forcing the material from this chamber into a mold opening to shape the articles after which they are removed and with the apparatus including a simplified transmission in which the operating parts are driven from a single rotating shaft so that the proper timing of the various operating parts including the transfer means, the pressure applying means and the article removing means for removing the molded articles from the mold can be easily timed to operate in their proper sequence and at their proper time.

The most pertinent prior art of which applicants are aware are U.S. Pat. No. 3,061,872 assigned to the assignee hereof which discloses a similar article removing or knockout apparatus and U.S. Pat. No. 3,203,037 which discloses a device for molding shaped articles of a plastic material and which uses a cam device for a pressure cam and a mold plate operated from a single rotatable shaft.

DESCRIPTION OF THE PREFERRED EMBODIMENT

As shown in the illustrated embodiment the molding device 10 of this invention comprises a heavy frame 11 movably supported on wheels 12. On top of the frame is a hopper 13 for holding the material 14 such as ground raw meat for making hamburger patties. Located within the hopper bottom 15 are a pair of parallel horizontal feed augers 16 and 17 that are rotated toward each other to feed the material 14 forward and down between them as indicated by the arrows 18.

Figure 4:
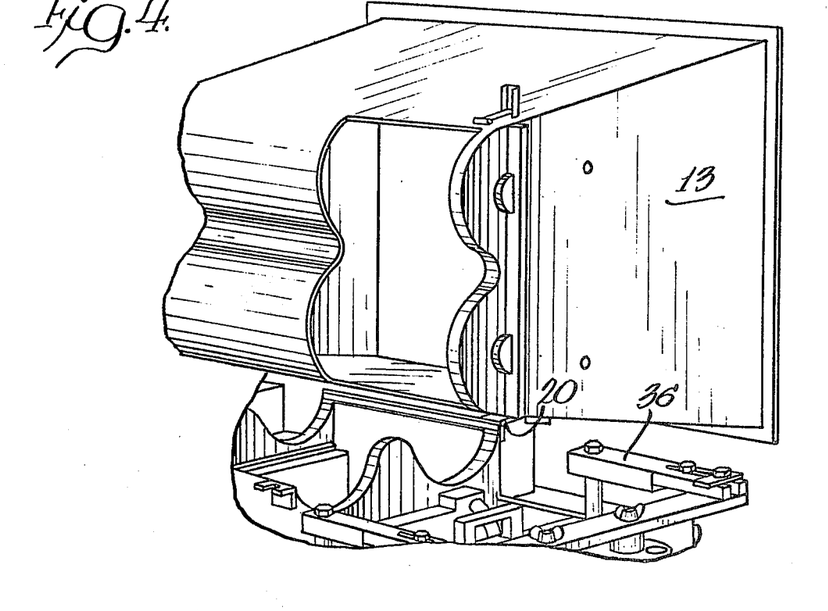
FIG. 4 is a fragmentary perspective view showing the hopper rotated to access position for cleaning or other servicing.

The hopper is held in operating position by spaced clamps 19 which when released permit the hopper to be rotated about hinges 20 to the open position of FIG. 4 for cleaning, servicing and the like.

Located beneath the forward end of the hopper 13 and augers 16 and 17 is a pressure chamber 21 in which is reciprocated a pressure ram 22 as shown in various positions in FIGS. 9-12.

Extending from one end of the frame 11 is a customary type conveyor 23 that receives the molded articles or patties 24 (FIGS. 9-12) after they have been formed.

The device is provided with a reciprocable mold 25 here shown as a mold plate having a pair of mold openings 26 into which the material is forced to form the patties.

The operating parts of the apparatus are driven by an electric motor 27 that operates a gear reducer transmission 28 through a belt 29 and pulley 30 and 31 drive.

Figure 3:
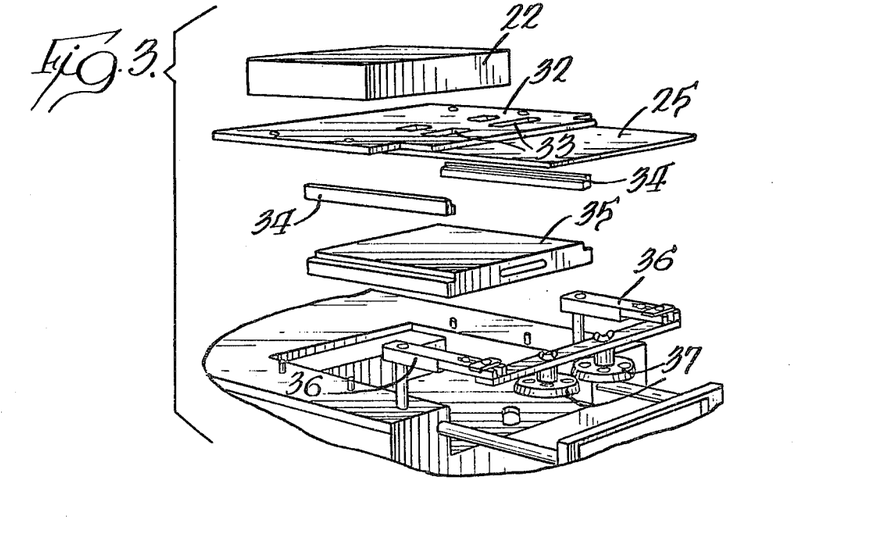
FIG. 3 is a detail perspective exploded view of a portion of the apparatus.

An exploded view of a portion of the apparatus is illustrated in FIG. 3 which shows in perspective view the pressure ram 22, the fill plate 32 located beneath it and having filling slots 33, the mold plate 25, side parallel spacer bars 34, an adapter plate 35 and a knockout arm 36 which supports the pair of knockout cups 37.

Figure 5:
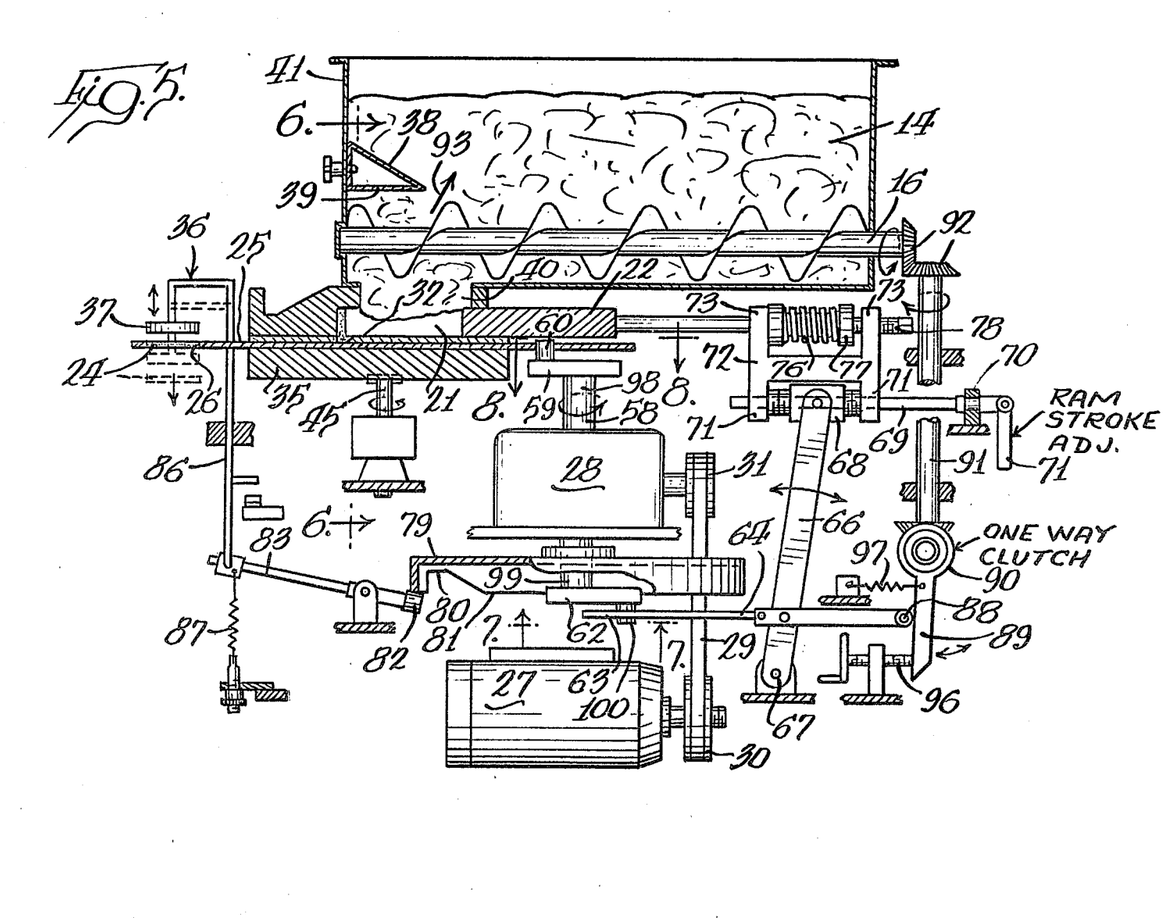
FIG. 5 is a semi-schematic view partially in section illustrating the structure and operation of the illustrated embodiment.

The molding device as illustrated has positioned within the hopper 13 an inwardly directed baffle 38 that has a flat bottom 39 at the forward end of the hopper and above the feed augers 16 and 17. As shown in FIG. 5 this baffle is located immediately above an exit opening 40 at the forward end 41 of the hopper with this access opening leading to the pressure chamber in which the pressure ram 22 is horizontally reciprocated.

Figure 11:
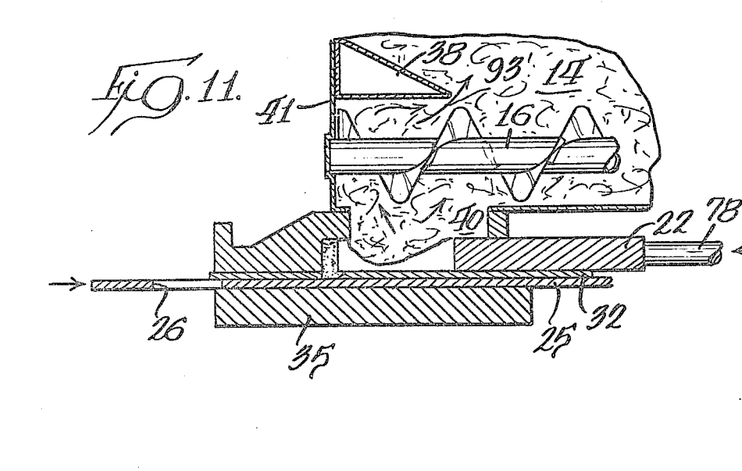
Figure 12:
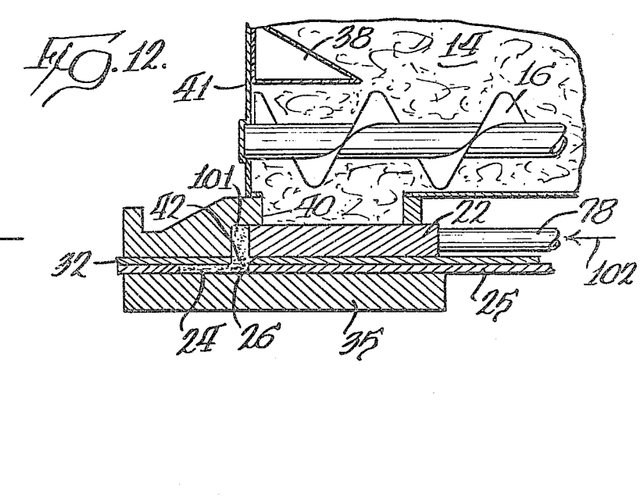

The ram moves in a horizontal path as illustrated in FIGS. 9-12 on top of a fill plate 32 which contains the pair of fill openings 42 that lead to the pair of mold openings 26 when the mold plate 25 is in retracted position and the ram 22 is in forward position as shown in FIG. 12. As shown in sequence in FIGS. 9-12 the ram 22 is moved to its forwardmost position as shown in FIG. 12 to force the material in front of the ram from the pressure chamber 21 through the fill openings 41 into the mold openings 26. As can be seen in FIG. 12, when the ram 22 is in its forwardmost position it effectively closes the exit opening 40 so that the full ram pressure can be used to form the patties 24.

Figure 9:
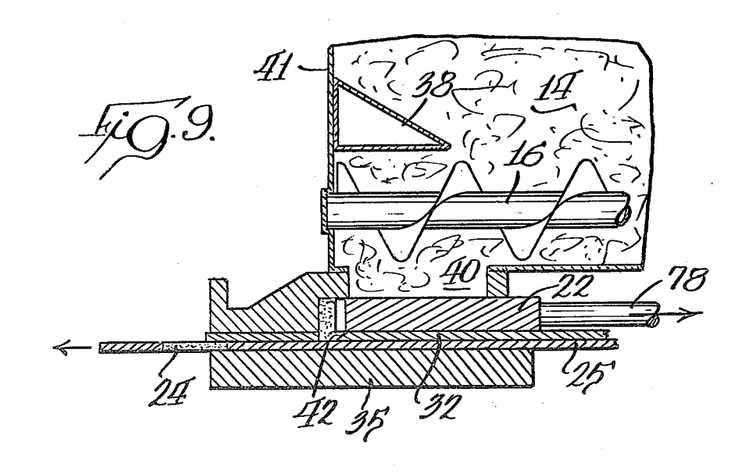
FIGS. 9-12 are fragmentary sectional views through a portion of the apparatus showing the positions of the parts during successive stages of operation.
Figure 10:
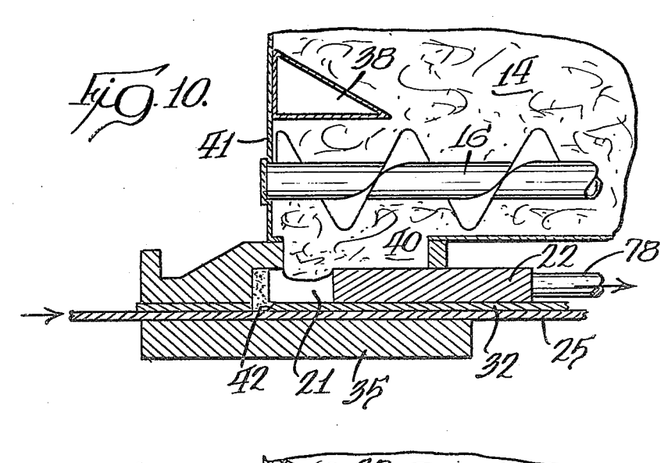

When this has been done the ram 22 is then started on its retracting movement as shown in FIG. 9 and the mold plate 25 with the patty 24 is started toward its projecting position. The mold plate 25 is continued to its forwardmost position of FIG. 5 at which the knockout cup 37 structure 36 removes the shaped patties 24 from their mold openings 26.

The reciprocable mold plate 25 is confined for horizontal movement between the fill plate 32 and an adjustable adapter plate 35 with the adapter plate being adjustable to accommodate mold plates of various thicknesses. In general, the larger the patty that is formed the thicker the mold plate and the smaller the patty the thinner. This device provides a rotary support 45 for the adapter plate 35.

Figure 6:
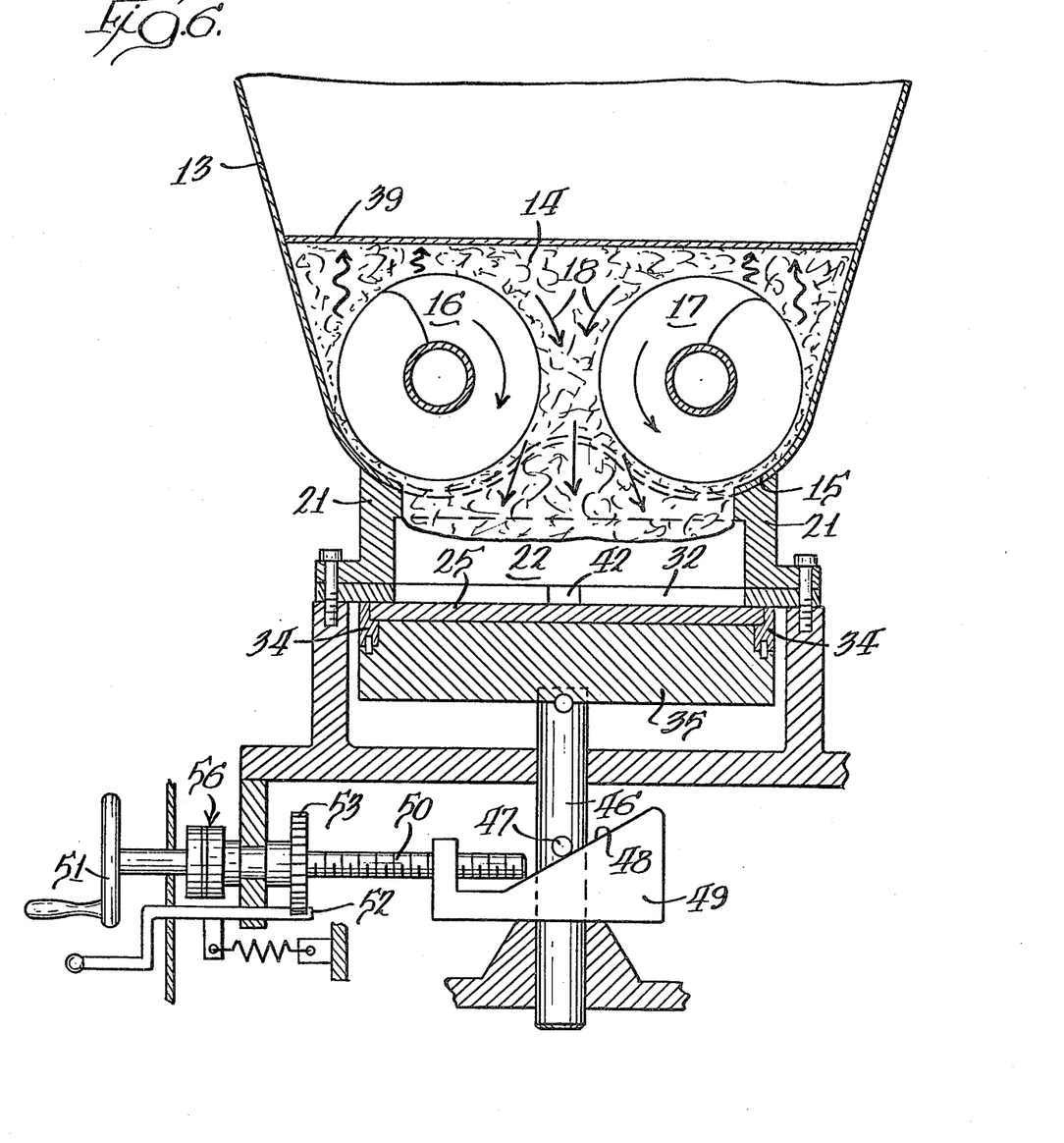
FIG. 6 is a fragmentary vertical sectional view substantially along line 6—6 of FIG. 5.

One type of adjustable adapter plate is shown in FIG. 6. Here the adapter plate 35 is held on a vertically movable post 46 which is provided with laterally projecting pins 47 resting on inclined faces 48 of side cams 49 with the cams being adjusted to lateral positions by a screw 50 drive rotated by a hand wheel 51 with the screw being retained in its adjusted position by a spring urged catch 52 engaging a notched coaxial wheel 53 on the screw 50. The force between the hand wheel adjacent the handle 51 and the adjusting cam 49 is applied through a slip clutch 56.

Figure 1:
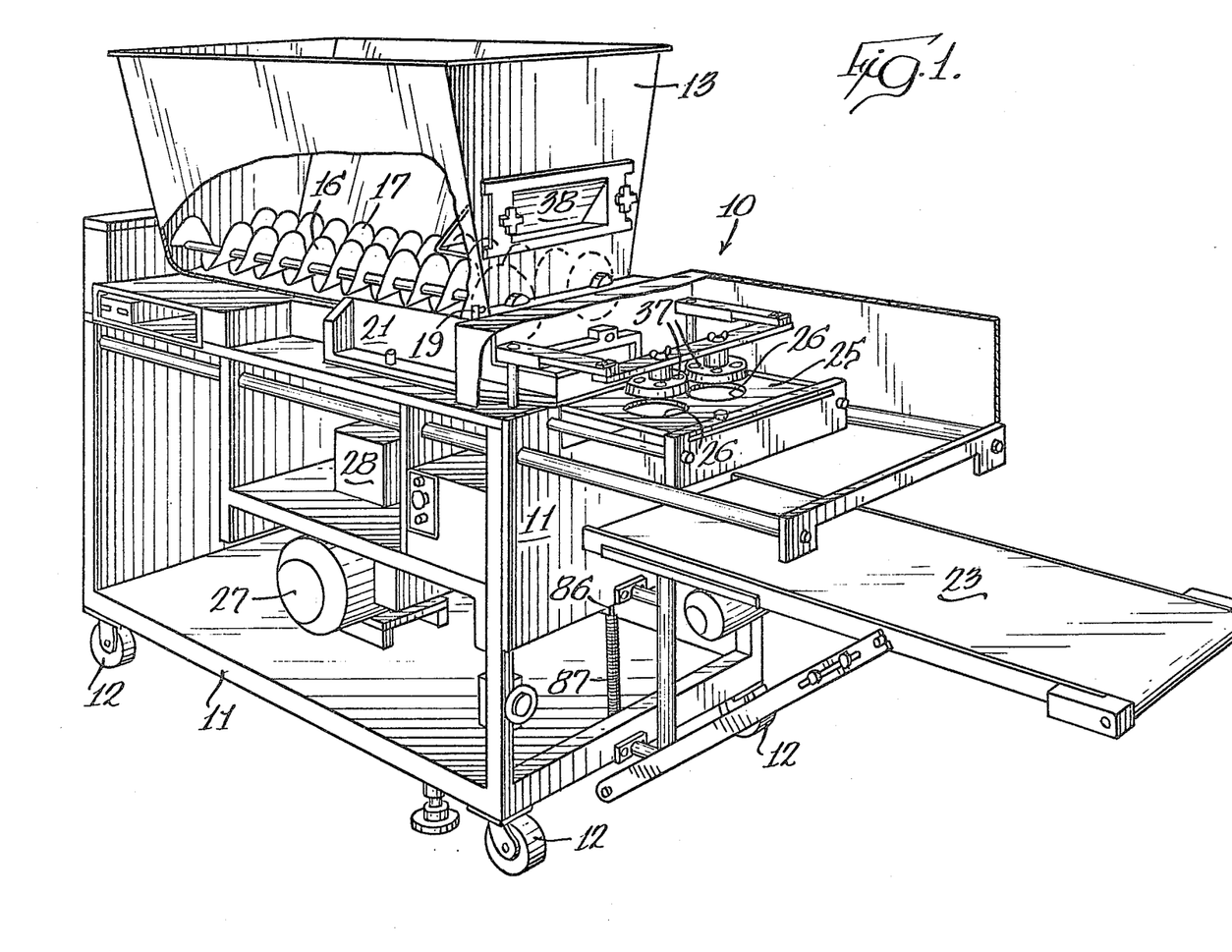
FIG. 1 is a perspective view partially broken away for clarity of illustration of a hamburger patty molding machine embodying the invention.
Figure 2:
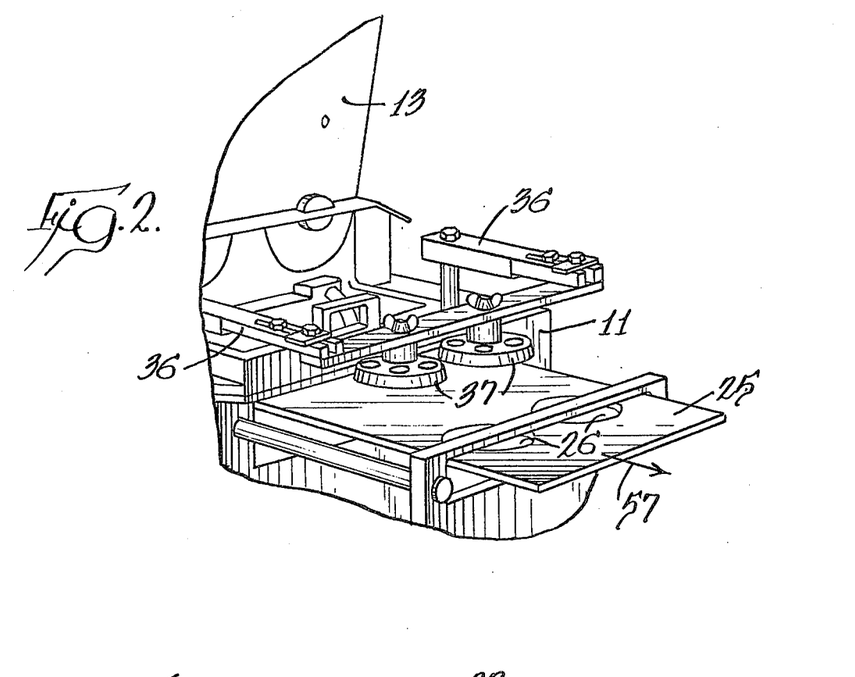
FIG. 2 is a fragmentary view similar to a portion of FIG. 1 and showing the two opening mold plate in the act of being removed for cleaning.

FIG. 2 illustrates the ease with which a mold plate 25 may be removed for replacement with a thinner or thicker mold plate depending upon the size of the patty desired. All that is necessary is to release the mold plate 25 and remove it forwardly as indicated by the arrows 57 for replacement with a different mold plate after when the adapter plate 35 is again raised up against the bottom of the plate 25 by the adjustment screw 50 adjusting the position of the cam plate 49 as described.

Figure 8:
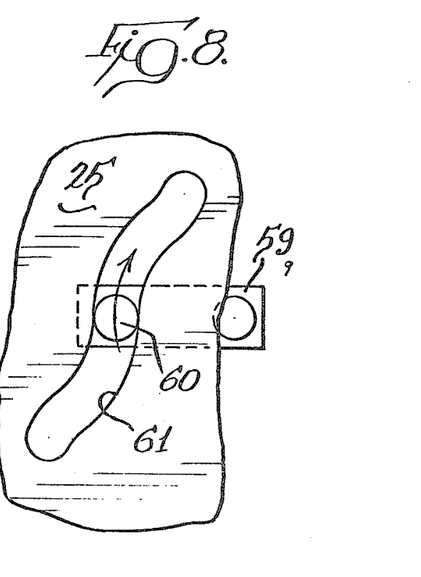
FIG. 8 is a fragmentary sectional view taken substantially along line 8—8 of FIG. 5.

The schematic structure is illustrated in FIG. 5. As is shown here the electric motor 27 through the belt 29 drives the transmission 28 which rotates the vertical shaft 58 in a counterclockwise direction as viewed from the top or from the line 8—8 of FIG. 5. This shaft 58 thereupon rotates the mold plate drive arm 59 which has an off-center post 60 operating in a curved cam follower slot 61 in the rear portion of the mold plate 25. This slot is shaped so as to give the proper dwell times at each end of the mold plate movement so as to provide time for filling the mold plate by the ram 22 when the plate is retracted and for removing the molded article or patty 24 when the mold plate is projected to the ejecting position of FIG. 5.

Figure 7:
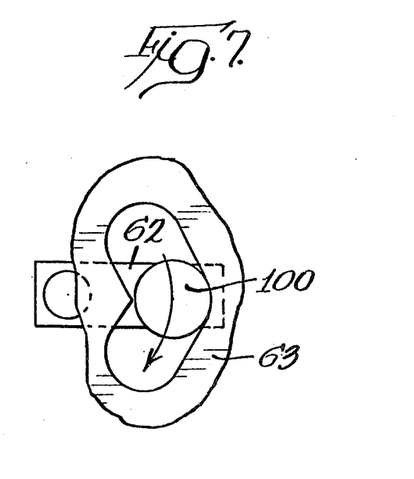
FIG. 7 is a fragmentary horizontal sectional view taken substantially along line 7—7 of FIG. 5.

The opposite or bottom end of this shaft 58 is provided with a similar arrangement including a drive arm 62, off center post 100 and cam 63 (FIGS. 5 and 7). This cam 63 reciprocates a pair of drive rods 64 horizontally to reciprocate a lever 66 fulcrumed at its bottom 67. The opposite or upper end of this lever 66 is hinged to a threaded collar 68 that hingedly engages a rotatable rod 69 that is rotatably held in a bracket 70. The end of this rod 69 is provided with a handle 71 for turning the rod 69 thereby adjusting the position of the collar 68 to adjust the length of the ram stroke all in the customary manner.

The threaded collar 68 is held between the parallel wings 71 of a drive bracket 72 and has a pair of opposite wings 73 between which is held a compression spring 76. This compression spring bears at one end against a nut 77 that is threaded to a rod 78 held by the wings 73 with this rod 78 being rotatable to adjust the position of the nut 77 thereon and thereby apply a precompression to the spring 76. The result is that the ram 22 is operated by the drive bracket 72 through the medium of the spring 76 which limits the maximum compression that can be applied to the ram 22 so as to prevent injury to the meat or similar product.

The bottom end of the shaft 58 is also connected to a knockout cam 79 which is concentric with the shaft and which contains a notch 80 that is a part of the bottom cam surface 81. This bottom cam surface 81 bears against a roller end 82 of the fulcrumed lever 83 whose other end is attached to a vertical knockout rod 86 carrying on its upper end the knockout cups 37. The bottom end of this rod 86 is attached to the outer end of the lever 83 and the whole assembly is urged downwardly by a spring 87.

The end of the drive rods 64 beyond the fulcrumed lever 66 carries a roller 88 bearing against a clutch arm 89 with a one-way clutch 90. This one-way clutch rotates a vertical shaft 91 in clockwise increments as viewed from the top and this in turn by means of the bevel gears 92 rotates an auger 16 in a counter-clockwise direction as viewed from the right-hand end of FIG. 5 and the other auger 17 in a counterclockwise direction due to intermeshing gears (not shown) on the two augers.

The molding apparatus of this invention therefore provides a structure in which meat or other moldable material is fed uniformly and gently to the pressure chamber 21 by the cooperating augers 16 and 17 and is directed by the baffle 39 down through the access opening 40 into the pressure chamber 21. Excess pressure on the meat at this point is avoided because the spacing of the bottom 39 of the baffle from the top of the augers is sufficient to permit the escape of meat from under the baffle 38 back into the hopper as indicated by the arrows 93.

The invention also provides a single motor driven shaft 58 for driving the pressure ram, the mold plate, the knockout cam, the ram drive and the intermittently rotatable augers all from the single vertical shaft. This of course greatly simplifies the timing of the various parts as adjustment is very simple, the parts all being connected to the single vertical shaft 58.

The ease of adjusting the timing of the various operating parts and the cams that operate them can be seen from FIG. 5. As earlier stated, the motor 27 drives the gear reducer and transmission 28 which in turn drives the vertical shaft 58 having the upper extending end 98 and lower end 99. These ends carry the various operating cams. The upper end 98 carries the mold plate drive arm 59 with its post 60 while the lower end 99 carries the ram drive arm 62 with its off-center post 100. This lower end 99 also carries the concentric knockout cam 79 with its knockout notch 80 with the arm 62 operating both the clutch arm 89 and the ram lever 66.

The timing is so simple because the relationship of the operations of the various parts can easily be controlled by determining the angular relationship of the cams 61, 63 and 79 with relation to the axis of rotation of the vertical shaft 58.

Thus as shown in FIGS. 9–12 the various cams must reciprocate the ram 22 and the mold plate 25 generally in opposition and the one-way clutch 90 must operate in proper timed relationship so as to move the material 14 to and through the exit opening 40 only while the ram 22 is being retracted and these augers must be motionless while the ram is being pressed forwardly or to the left as shown in FIGS. 11 and 12 to compress the meat or similar material in the space 101 that is forwardly of the advancing 102 ram.

If any of the operating parts accidentally get out of proper timed phase with the other parts it is only necessary to re-arrange this angular relationship to assure that all these parts operate in proper sequence.

In order to adjust the stroke of the clutch arm 89 and thus the degree of rotation increments of the augers 16 and 17 there is provided an adjusting screw 96 which predetermines the at rest position of the clutch arm 89 as it is spring 97 urged against the roller 88.

We claim:

1. A device for molding hamburger patties of ground raw meat while limiting the maximum total pressure applied to said meat, comprising: a hopper for said ground raw meat; means defining an exit opening for said meat from the hopper; a mold having a patty shaped mold opening; a pressure chamber for receiving pressurized said ground raw meat; transfer means in said hopper for moving said ground raw meat toward said exit opening from said hopper, said transfer means comprising at least one rotary auger in the bottom of the hopper having a forward end, said exit opening for said ground raw meat from said hopper being adjacent to said forward end; means defining an access opening to said pressure chamber communicating with said exit opening; means defining a fill opening extending between said pressure chamber and a said mold opening; pressure applying means in said pressure chamber for forcing said ground raw meat from said pressure chamber through said fill opening and into a said mold opening; and a pressure confining baffle in said hopper adjacent to but spaced from the forward end portion of said auger that is substantially diametrically opposite to said exit opening for the ground raw meat from said hopper, thereby permitting flow of said ground raw meat between said auger and said baffle into said hopper.

2. The device of claim 1 wherein said auger is substantially horizontal, said baffle being positioned above the forward end of said horizontal auger and opposite to said hopper exit opening and pressure chamber.

3. The device of claim 1 wherein said pressure applying means comprises a reciprocable ram in said pressure chamber and means for reciprocating said ram toward and away from said fill opening.

4. The device of claim 3 wherein there are provided means connected to said auger for intermittently rotating said auger during the time when said ram is moving away from said fill opening.

5. The device of claim 2 wherein there are provided a pair of said augers extending horizontally in the hopper and with their peripheries spaced apart to provide for movement of said ground raw meat during rotation of the augers down between them and through said access opening, and means for intermittently rotating said augers counter to each other.

6. The device of claim 1 wherein said baffle extends into said hopper a distance more than half but less than the full length of said access opening in a corresponding direction.

7. A device for molding hamburger patties of ground raw meat while limiting the maximum total pressure applied to said meat, comprising: a hopper for the meat; means defining an exit opening for said meat from the hopper; a mold having a patty shaped mold opening; a pressure chamber for receiving pressurized said ground raw meat; transfer means in said hopper for moving said ground raw meat toward said exit opening for said ground raw meat from said hopper, said transfer means comprising at least one rotary auger in the bottom of the hopper having a forward end, said exit opening for said ground raw meat from said hopper being adjacent to said forward end; means defining an access opening to said pressure chamber communicating with said exit opening; means defining a fill opening extending between said pressure chamber and a said mold opening; pressure applying means in said pressure chamber for forcing said ground raw meat from said pressure chamber through said fill opening and into a said mold opening; a pressure confining baffle in said hopper adjacent to but spaced from the forward end portion of said auger that is substantially diametrically opposite to said exit opening for the ground raw meat from said hopper, thereby permitting flow of said ground raw meat between said auger and said baffle into said hopper; a motor drive including a rotatable shaft driven thereby; a drive cam on said shaft and operatively connected to said mold for reciprocating the mold between a filling position for the mold opening and an ejecting position externally of the apparatus for ejecting the molded article; a second cam; and means operatively rotated by said shaft for intermittently rotating said transfer means auger.

8. The device of claim 7 wherein there are provided means connected to said auger for intermittently rotating said auger during the time when said ram is moving away from said fill opening.

9. The device of claim 8 wherein said auger drive means comprises a one-way clutch means for preventing rotation of the auger during pressure applying operation of the ram.

10. Th device of claim 9 wherein said one-way clutch is provided with an adjusting means to pre-position the clutch and thereby determine the extent of rotation of the auger during said rotation.

11. The device of claim 7 wherein said rotatable shaft is operatively connected to said mold plate drive cam and to said ram and auger drive cam and there is also provided an article ejecting mechanism operated by a knockout cam that is likewise operatively connected to said transmission shaft.

* * * * *

UNITED STATES PATENT AND TRADEMARK OFFICE
CERTIFICATE OF CORRECTION

PATENT NO. : 4,153,974
DATED : May 15, 1979
INVENTOR(S) : James A. Holly et al

It is certified that error appears in the above-identified patent and that said Letters Patent are hereby corrected as shown below:

Figure 6 - Plate 32 should be in section the same as plate 25 and the numeral 42 with lead line and the two perpendicular lines on opposite sides of the lead line should be removed.

Column 2 - line 26, after "hopper" omit "with this" and insert a period (.)

Column 2 - line 27, before "access" insert -- The upper end of this exit opening 40 serves as an exit from the hopper and the lower end serves as an --

Column 2 - line 31, after "42" insert -- , illustrated in Figure 3 as transverse slots 33 --

Column 2 - line 37, change "41" to -- 42 --

Signed and Sealed this

Eighteenth Day of November 1980

[SEAL]

Attest:

SIDNEY A. DIAMOND

Attesting Officer          Commissioner of Patents and Trademarks